US009307345B2

(12) United States Patent
Lee et al.

(10) Patent No.: US 9,307,345 B2
(45) Date of Patent: Apr. 5, 2016

(54) SEPARABLE MODULE TYPE SNAKE ROBOT FOR PROVIDING SEAMLESS COMMUNICATION AND OPERATION METHOD OF THE SAME

(71) Applicant: Electronics and Telecommunications Research Institute, Daejeon (KR)

(72) Inventors: Chang Eun Lee, Daejeon (KR); Sung Hoon Kim, Daejeon (KR); Jong Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/451,714

(22) Filed: Aug. 5, 2014

(65) Prior Publication Data

US 2015/0197015 A1     Jul. 16, 2015

(30) Foreign Application Priority Data

Jan. 13, 2014   (KR) .......................... 10-2014-0003780

(51) Int. Cl.
*B25J 9/00* (2006.01)
*H04W 4/00* (2009.01)
*B25J 9/06* (2006.01)
*B25J 9/08* (2006.01)
*B25J 13/00* (2006.01)

(52) U.S. Cl.
CPC ............... *H04W 4/005* (2013.01); *B25J 9/065* (2013.01); *B25J 9/08* (2013.01); *B25J 13/006* (2013.01); *Y10S 901/01* (2013.01); *Y10S 901/28* (2013.01)

(58) Field of Classification Search
CPC ....... Y10S 901/01; B25J 9/0003; H04L 12/12
USPC .................. 700/245, 264; 701/2, 23, 36, 408; 901/1, 47; 318/568.12, 568.1, 568.11
See application file for complete search history.

(56) References Cited

U.S. PATENT DOCUMENTS

| 5,947,213 | A  | * | 9/1999  | Angle et al. ..................... 175/24 |
| 7,210,364 | B2 | * | 5/2007  | Ghorbel et al. .............. 73/865.8 |
| 8,571,711 | B2 | * | 10/2013 | Jacobsen et al. .............. 700/247 |
| 8,935,014 | B2 | * | 1/2015  | Jacobsen et al. .................. 701/2 |
| 2007/0008918 | A1 | * | 1/2007 | Stanforth ....................... 370/328 |
| 2013/0123981 | A1 |   | 5/2013 | Lee et al. |

FOREIGN PATENT DOCUMENTS

| KR | 1020130031093 A | 3/2013 |
| KR | 1020130037056 A | 4/2013 |

* cited by examiner

*Primary Examiner* — Dalena Tran
(74) *Attorney, Agent, or Firm* — William Park & Associates Ltd.

(57) ABSTRACT

Disclosed is a snake robot for exploration and disclosed is a separable module type snake robot that configures an ad-hoc mesh network by separating a body part into multiple mobile relay modules according to a propagation situation to seamlessly transmit image information to a remote control center.

14 Claims, 3 Drawing Sheets

SEPARABLE MODULE TYPE SNAKE ROBOT FOR PROVIDING SEAMLESS COMMUNICATION AND OPERATION METHOD OF THE SAME

CROSS-REFERENCE TO RELATED APPLICATIONS

This application claims priority to and the benefit of Korean Patent Application No. 10-2014-0003780 filed in the Korean Intellectual Property Office on Jan. 13, 2014, the entire contents of which are incorporated herein by reference.

TECHNICAL FIELD

The present invention relates to a snake robot, and more particularly, to a separable module type snake robot that configures an ad-hoc mesh network by separating a body part into multiple mobile relay modules according to a propagation situation to seamlessly transmit image information to a remote control center, and an operation method of the same.

BACKGROUND

A robot represents a machine having a shape and a function similar to human or a machine having a capability to work something for itself. A robot that uses artificial power may work instead of human or together with human. In general, the robot is designed to perform a work planned by a manufacturer and substitutes a lot of works which have been performed by humans.

In recent years, a snake type robot for performing life detection and environmental exploration missions has been developed under an atypical environment (a building collapse site, a water supply and drainage pipe, a cave, a biochemistry contamination area, and the like) which human cannot geographically explore by himself/herself.

The snake robot for exploration is mounted with a communication device for transmitting an image signal acquired by photographing an exploration area and positional information.

However, since the snake robot performs a mission primarily in shadow areas that easily deviate from a valid communication range, such as a tunnel, a drain pipe, an underground facility, and the like, there is a problem in that the snake robot may easily deviate from a control zone.

SUMMARY OF THE INVENTION

The present invention has been made in an effort to provide a snake robot for exploration that can seamlessly transmit image information to a remote control center even in a communication shadow area.

An exemplary embodiment of the present invention provides a module type snake robot, including: a plurality of robot modules separably connected, wherein the robot modules are independently separated according to a propagation situation for wireless communication with a control center.

The robot modules may be separated sequentially from a robot module connected to the rearmost portion.

The robot modules may include a first robot module; and at least one second robot module connected to the first robot module to relay wireless communication between the first robot module and the control center and selectively separated from the first robot module according to the propagation situation with the control center.

When a received signal strength indication (RSSI) and a link quality indicator (LQI) with the control center are analyzed and the propagation situation is degraded to a predetermined level, the second robot module may be selectively separated from the first robot module.

The second robot modules may be sequentially separated from the robot module connected to the rearmost portion when the plurality of robot modules is connected in series.

Each of the second robot modules may include: a first communication device which performs the wireless communication with a neighboring robot module or the control center; a first driving device which moves the second robot module; and a first recognition device which controls the position of the second robot module by analyzing the propagation situation with the neighboring robot module or the control center.

The first recognition device may move the second robot module to a place where the propagation situation is better by controlling the first driving device after the second robot module is separated.

The first robot module may include an imaging device which generates an image signal by photographing an exploration area; a second communication device which wirelessly transmits the image signal to the second robot module; a second driving device which moves the first robot module; and a second recognition device which controls the position of the first robot module by analyzing a propagation situation with the second robot module.

Another exemplary embodiment of the present invention provides an operation method of a snake robot in which a plurality of robot modules are connected, including: analyzing a propagation situation with a control center while the snake robot advances according to control by the control center; and separating a first robot module connected to the rearmost portion among the plurality of robot modules when the propagation situation with the control center is degraded to a predetermined level.

In the analyzing of the propagation situation, a received signal strength indication (RSSI) and a link quality indicator (LQI) with the control center may be analyzed.

The method may further include moving the separated first robot module to a place where the propagation situation with the control center is better.

The method may further include: analyzing a propagation situation with the first robot module while the snake robot advances according to control by the control center; and separating a second robot module connected to the rearmost portion when the propagation situation with the first robot module is degraded to a predetermined level.

According to exemplary embodiments of the present invention, a snake robot for exploration can seamlessly transmit image information to a remote control center even in a communication shadow area.

Figure 1:
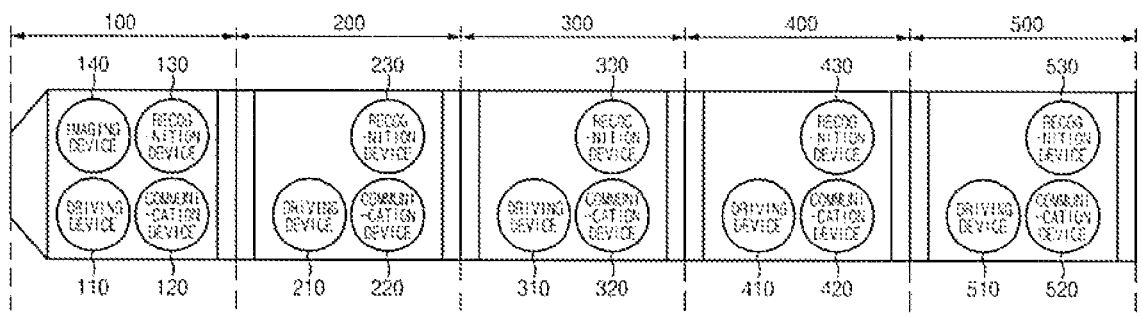
FIG. 1 is a configuration diagram schematically illustrating an entire structure of a separable module type snake robot according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. Prior to this, terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner. Therefore, configurations illustrated in the embodiments and the drawings described in the present specification are only the most preferred embodiment of the present invention and do not represent all of the technical spirit of the present invention, and thus it is to be understood that various equivalents and modified examples, which may replace the configurations, are possible when filing the present application.

FIG. 1 is a configuration diagram schematically illustrating an entire structure of a separable module type snake robot according to an exemplary embodiment of the present invention.

The snake robot according to the exemplary embodiment has a structure in which a robot module 100 corresponding to a head part and modules 200 to 500 corresponding to a body part are connected in series to be separated.

The respective robot modules 100 to 500 commonly include driving devices 110, 210, 310, 410, and 510, communication devices 120, 220, 320, 420, and 520, and recognition devices 230, 330, 430, and 530 and the robot module 100 corresponding to the head part of the snake robot further includes an imaging device 140.

The driving devices 110, 210, 310, 410, and 510 control driving (movement) of the corresponding robot modules. The driving devices 110, 210, 310, 410, and 510 may include a driving motor, a driving gear coupled with the driving motor, a driving wheel coupled with the driving gear, and a controller driving the driving motor. In this case, the driving wheel is formed at left and right sides and/or upper and lower sides of the robot modules 100 to 500, and as a result, driving may be stably performed even though the robot is overturned. Further, the robot modules 100 to 500 may include joints for advancement and a change of a direction of the snake robot and sensor devices (a gyro sensor, an acceleration sensor, and the like) required for controlling the robot. The driving devices 110, 210, 310, 410, and 510 enable the robot to be driven even in the state where the respective robot modules 100 to 500 are both connected to each other and independently separated from each other. Since the snake robot according to the exemplary embodiment does not have a characteristic that the snake robot advances (moves) in itself, as devices and methods used for the driving of the snake robot, devices and methods used in the snake robot in the related art may be used. Therefore, hereinafter, a detailed description of a structure and a driving method for driving the snake robot will be skipped.

The communication devices 120, 220, 320, 420, and 520 enable the robot modules mounted with the communication devices to perform wireless communication by setting communication connection with the neighboring robot modules 100 to 500 or a remote control device (not illustrated). In this case, the communication devices 120, 220, 320, 420, and 520 may transmit the image signal generated in the robot module 100 to the control device by configuring a WLAN based ad-hoc mesh network therebetween. That is, the communication devices 220, 320, 420, and 520 mounted on the robot modules 200 to 500 corresponding to the body part of the snake robot serve as a relay device (relay router) that relays communication between the robot module 100 corresponding to the head part of the snake robot and the remote control device.

The recognition devices 130, 230, 330, 430, and 530 control the positions of the robot modules 200 to 500 in which the recognition devices 130, 230, 330, 430, and 530 are installed so that an optimal communication link is maintained without propagation interruption between the snake robot and the control center even while the snake robot moves by analyzing a propagation situation between the robot modules or between the robot module and a control device (not illustrated) of which communication connection is configured. For example, when the recognition devices 230, 330, 430, and 530 determine that the robot modules in which the recognition devices 230, 330, 430, and 530 are installed may deviate from an effective propagation range by analyzing a physical signal with the robot module or the remote control device of which the communication connection is configured, for example, a received signal strength indication (RSSI) and a link quality indicator (LQI), the recognition devices 230, 330, 430, and 530 separate the robot modules 200 to 500 in which the recognition devices 230, 330, 430, and 530 are installed from the snake robot. Further, the recognition devices 130, 230, 330, 430, and 530 control operations of the driving devices 110, 210, 310, 410, and 510 to move the robot modules 100 to 500 of which the recognition devices 130, 230, 330, 430, and 530 are installed to a place where the propagation situation is better.

The imaging device 140 is installed in the robot module 100 which is positioned at the foremost portion of the snake robot, and photographs an exploration area and signal-processes the photographed image to generate an image signal.

FIG. 2A, FIG. 2B, FIG. 2C and FIG. 2D are diagrams illustrating a shape in which the snake robot of FIG. 1 is sequentially separated by the unit of the robot module to configure an ad-hoc mesh.

When there is a possibility that the snake robot of the exemplary embodiment deviates from the effective propagation range while moving to a specific area according to an instruction from the control center or the snake robot enters a propagation shadow area, the robot modules 200 to 500 constituting the body part are separated sequentially from robot modules which are connected to the rearmost side to allow the separated robot module(s) to serve as a relay router, thereby maintaining the communication connection with the remote control center.

Figure 2A:
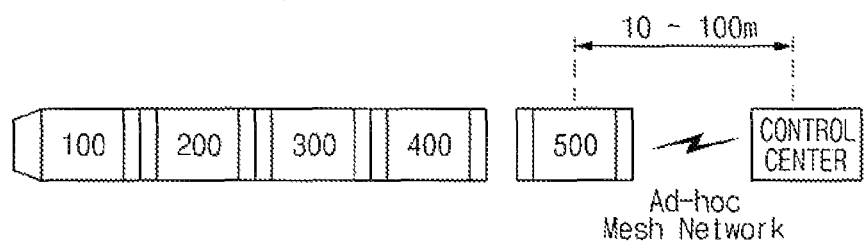
FIG. 2A is a diagram illustrating a shape in which the snake robot of FIG. 1 is separated to configure an ad-hoc mesh.

For example, when the propagation situation is degraded to a predetermined level or less as the snake robot recedes away from the control center as illustrated in FIG. 2A, the robot module 500 which is connected to the rearmost side is separated to remain within the effective propagation range with the control center and a snake robot which is not separated continuously moves. In this case, the separated robot module 500 serves as the relay router between the snake robot and the control center to maintain the communication connection between the snake robot and the control center without being interrupted.

When the snake robot continuously advances and the snake robot and the robot module 500 recede away from each other and the propagation is thus again degraded to the predetermined level or less, the robot module 400 that is connected to the rearmost side as illustrated in FIG. 2I is additionally separated. In this case, the separated robot module 400 serves as the relay router between the snake robot and the robot module 500 to maintain the communication connection between the snake robot and the robot module 500 without being interrupted. That is, the snake robot communicates with the control center through the previously separated robot module 500 and the additionally separated robot module 400 to perform the exploration by moving farther while maintaining the communication connection with the control center.

Figure 2B:
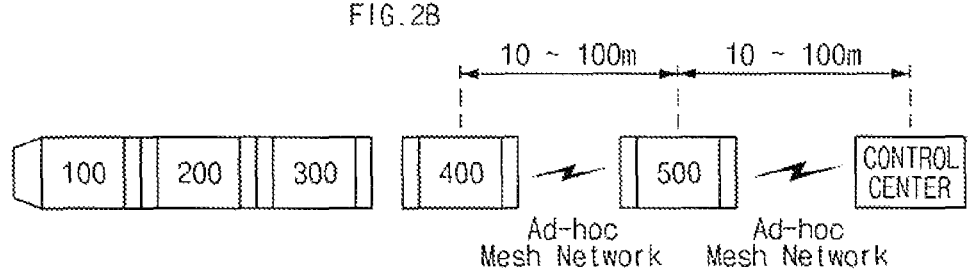
FIG. 2B is a diagram illustrating a shape in which the snake robot of FIG. 2A is separated to configure an ad-hoc mesh.
Figure 2C:
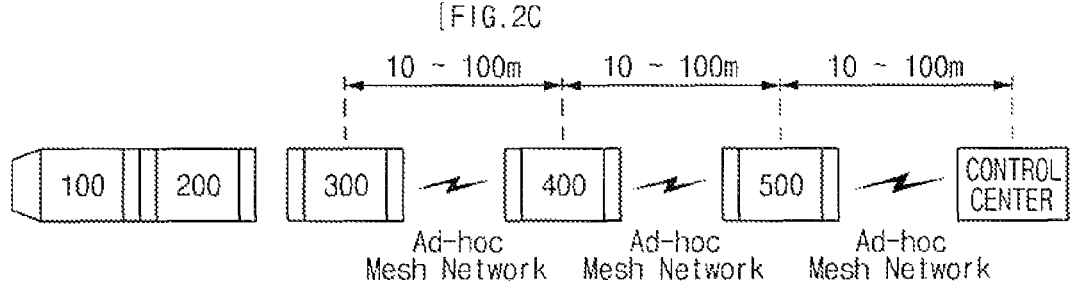
FIG. 2C is a diagram illustrating a shape in which the snake robot of FIG. 2B is separated to configure an ad-hoc mesh.
Figure 2D:
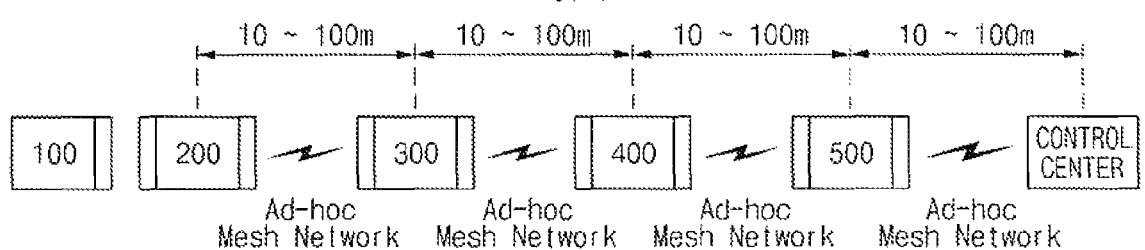
FIG. 2D is a diagram illustrating a shape in which the snake robot of FIG. 2C is separated to configure an ad-hoc mesh.

Thereafter, when the propagation situation of the snake robot is again degraded due to the continuous advancement of the snake robot, the robot modules which are connected to the rearmost portion are sequentially separated as illustrated in FIGS. 2C and 2D. The separation may be repeatedly performed until all of the robot modules constituting the body part are separated.

When the body part of the snake robot is fully separated and thereafter, only the robot module 100 in the head part recedes away from the robot module 200 while continuously advancing and the propagation situation is degraded, the robot module 100 may transmit such a situation to the control center through the robot modules 200 to 500 without advancing any longer.

That is, the robot modules 200 to 500 relay wireless communication between the robot module 100 and the control center while the robot modules 200 to 500 are connected to the snake robot while being positioned within the effective propagation range with a neighboring robot module or the control center of which communication connection is configured. However, when the robot modules 200 to 500 deviate from the effective propagation range due to the movement of the snake robot, the robot modules are independently separated sequentially from the robot module which is positioned at the rearmost portion and remain within the effective propagation range to relay the wireless communication between the robot module 100 and the control center 100.

Figure 3:
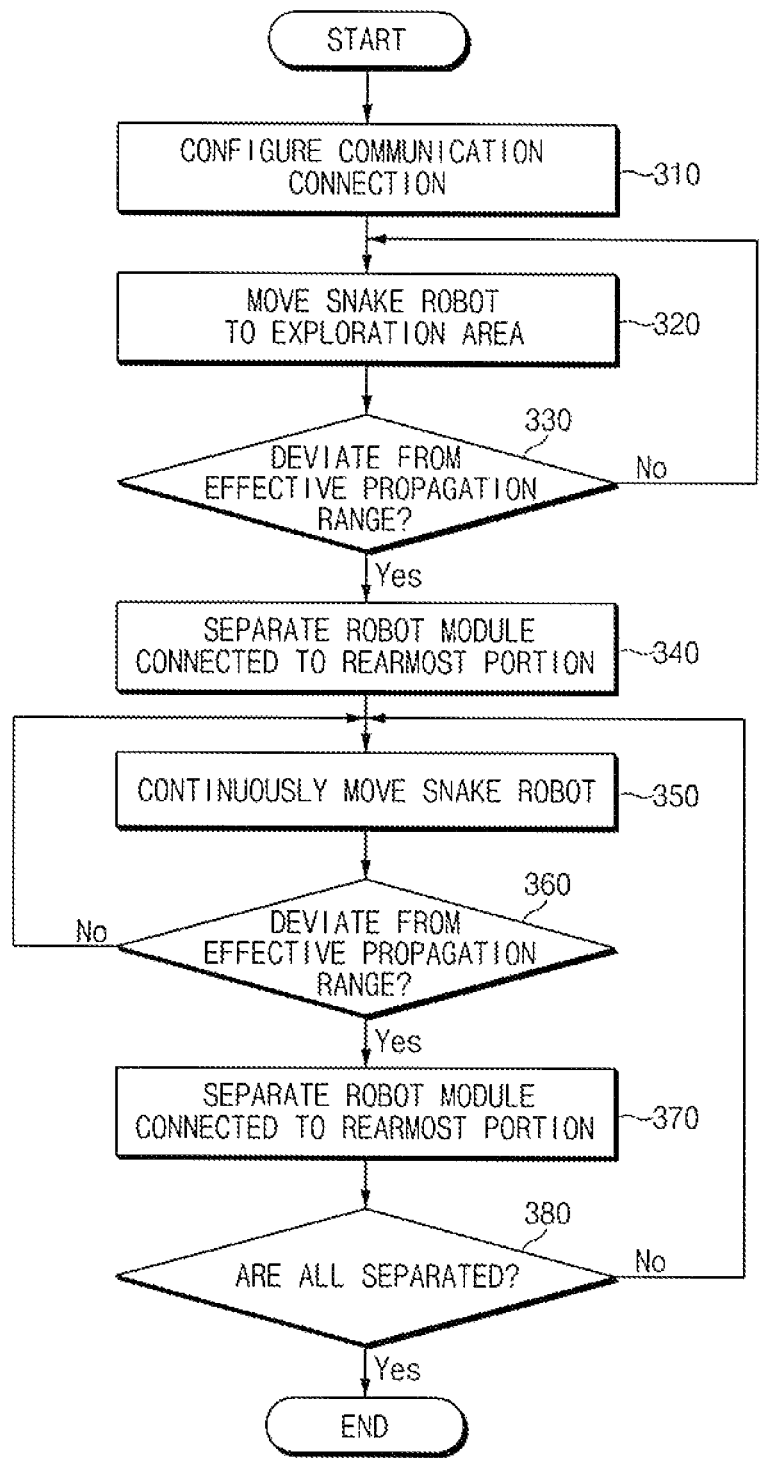
FIG. 3 is a flowchart for describing an operation procedure of a separable module type snake robot according to an exemplary embodiment of the present invention.

FIG. 3 is a flowchart for describing an operation procedure of a separable module type snake robot according to an exemplary embodiment of the present invention.

First, communication connection is configured among the robot modules 100 to 500 of the snake robot to be sent to the exploration area and communication connection between the robot module 500 which is connected to the rearmost portion of the snake robot and the control center is configured (step 310).

That is, in the exemplary embodiment, since the robot modules 100 to 500 constituting the snake robot independently include the communication devices 120, 220, 320, 420, and 520, respectively, the robot modules 100 to 500 register required information in order to configure the ad-hoc mesh network each other.

When the communication connection configuration is completed, the remote control center controls the driving (movement) of the snake robot to move the snake robot to the exploration area (step 320).

In this case, a control signal from the control center is transmitted to the communication device 530 of the robot module 500 which is connected to the rearmost portion of the snake robot and the control signal received by the communication device 530 is transferred to the communication device 130 of the robot module 100 sequentially through the communication devices 430, 330, and 230 of the robot modules 400, 300, and 200 connected to the previous portion thereof. The robot module 100 controls motion of the snake robot according to the control by the control center to move to the exploration area. In this case, as a method for controlling the driving devices 110, 210, 310, 410, and 510 of the robot modules 100 to 500 so that the snake robot goes forward, the same method as the snake robot in the related art may be used. That is, the method for making the snake robot go forward itself may be achieved by the method in the related art.

While the snake robot moves, the imaging device 140 of the robot module 100 photographs a front situation and signal-processes the photographed image to generate an image signal. The generated image signal is transferred to the communication device 220 of the neighboring robot module 200 through the communication device 120 and again, transmitted to the control center sequentially through the communication devices 320, 420, and 520 of the robot modules 300 to 500 connected to the rear portion thereof.

When the snake robot and the control center gradually recede away from each other due to the movement of the snake robot, the robot module 500 connected to the rearmost portion of the snake robot may deviate from the effective propagation range with the control center.

As such, when the snake robot and the control center recede away from each other and the propagation situation between the robot module 500 and the control center is degraded to a predetermined level or less (step 330), the recognition device 530 of the robot module 500 separates the robot module 500 from the snake robot as illustrated in FIG. 2A (step 340).

For example, the recognition device 530 analyzes a physical signal with the remote control device, for example, a received signal strength indication (RSSI) and a link quality indicator (LQI) while the snake robot advances according to the control by the control center and when the propagation situation is degraded to the predetermined level or less, the recognition device 530 may determine that there is a possibility that the robot module 500 will deviate from the effective propagation range with the control center.

As such, the robot module 500 is separated from the snake robot, and as a result, the robot module 500 continuously exists within the effective propagation range with the control center. After the robot module 500 is separated, the recognition device 530 controls an operation of the driving device 510 to move the robot module 500 to a place where the propagation situation with the control device is better.

The snake robot separated with the robot module 500 photographs the exploration area while continuously moving the exploration area according to the control by the control center and transmits the image signal to the control center through the communication device 520 of the separated robot module 500 (step 350).

That is, the snake robot communicates with the control center through the ad-hoc mesh network with the separated robot module 500 to move farther from the control center while continuously stably maintaining the communication connection.

When the snake robot and the robot module 500 gradually recede away from each other due to the movement of the snake robot, the robot module 400 which is connected to the rearmost portion of the snake robot may deviate from the effective propagation range with the robot module 500.

As such, when the snake robot and the robot module 500 recede away from each other and the propagation situation between the robot module 400 and the robot module 500 is thus degraded to the predetermined level or less (step 360), the recognition device 430 of the robot module 400 separates the robot module 400 from the snake robot as illustrated in FIG. 2B (step 370).

For example, when the recognition device 430 analyzes the received signal strength indication (RSSI) and the link quality indicator (LQI) with the robot module 500 and the propagation situation is degraded to the predetermined level or less, the recognition device 430 may determine that there is a possibility that the robot module 400 will deviate from the effective propagation range with the robot module 500.

As such, the robot module 400 is separated from the snake robot, and as a result, the robot module 400 continuously exists in the effective propagation range with the robot module 500. That is, the snake robot communicates with the control center through the ad-hoc mesh network with the robot modules 400 and 500 to move farther from the control center while continuously stably maintaining the communication connection.

As such, a procedure in which the robot module which is connected to the rearmost portion of the snake robot is separated according to the propagation situation with the already separated robot module may be repeatedly performed until all of the robot modules 200 and 300 corresponding to the body part of the snake robot as illustrated in FIGS. 2C and 2D) (step 380).

When all of the robot modules 200 to 500 are separated, the robot module 100 corresponding to the head part continuously performs the exploration while maintaining the communication with the control center through the ad-hoc mesh network with the separated robot modules 200 to 500. However, when the robot module 100 deviates from the effective propagation range with the robot module 200, the image signal cannot be transmitted any longer. Accordingly, when the recognition device 130 determines that there is a possibility that the robot module 100 will deviate from the effective propagation range with the robot module 200, the recognition device 130 may transfer such a fact to the control center through the ad-hoc mesh network of the robot modules 200 to 500.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

What is claimed is:

1. A module type snake robot, comprising:
    a plurality of robot modules separably connected,
    wherein the robot modules are independently separated according to a propagation situation for wireless communication with a control center,
    wherein the robot modules are initially connected to each other and separated sequentially.

2. The module type snake robot of claim 1, wherein the robot modules are separated sequentially from a robot module connected to the rearmost portion.

3. The module type snake robot of claim 1, wherein the robot modules include:
    a first robot module; and
    at least one second robot module connected to the first robot module to relay wireless communication between the first robot module and the control center and selectively separated from the first robot module according to the propagation situation with the control center.

4. The module type snake robot of claim 3, wherein when a received signal strength indication (RSSI) and a link quality indicator (LQI) with the control center are analyzed and the propagation situation is degraded to a predetermined level, the second robot module is selectively separated from the first robot module.

5. The module type snake robot of claim 4, wherein each of the second robot modules includes:
    a first communication device which performs the wireless communication with a neighboring robot module or the control center;
    a first driving device which moves the second robot module; and
    a first recognition device which controls the position of the second robot module by analyzing the propagation situation with the neighboring robot module or the control center.

6. The module type snake robot of claim 5, wherein the first recognition device moves the second robot module to a place where the propagation situation is better by controlling the first driving device after the second robot module is separated.

7. The module type snake robot of claim 3, wherein the second robot modules are sequentially separated from the robot module connected to the rearmost portion when the plurality of robot modules are connected in series.

8. The module type snake robot of claim 3, wherein the first robot module includes:
    an imaging device which generates an image signal by photographing an exploration area;
    a second communication device which wirelessly transmits the image signal to the second robot module;
    a second driving device which moves the first robot module; and
    a second recognition device which controls the position of the first robot module by analyzing a propagation situation with the second robot module.

9. An operation method of a module type snake robot in which a plurality of robot modules are connected, the method comprising:
    analyzing a propagation situation with a control center while the snake robot advances according to control by the control center; and
    separating a first robot module connected to the rearmost portion among the plurality of robot modules when the propagation situation with the control center is degraded to a predetermined level,
    wherein the robot modules are initially connected to each other and separated sequentially.

10. The method of claim 9, wherein in the analyzing of the propagation situation, a received signal strength indication (RSSI) and a link quality indicator (LQI) with the control center are analyzed.

11. The method of claim 10, further comprising:
    analyzing a propagation situation with the first robot module while the snake robot advances according to control by the control center; and separating a second robot module connected to the rearmost portion when the propagation situation with the first robot module is degraded to a predetermined level.

12. The method of claim 9, further comprising:
moving the separated first robot module to a place where the propagation situation with the control center is better.

13. The method of any one of claim 12, further comprising:
analyzing a propagation situation with the first robot module while the snake robot advances according to control by the control center; and
separating a second robot module connected to the rearmost portion when the propagation situation with the first robot module is degraded to a predetermined level.

14. The method of claim 9, further comprising:
analyzing a propagation situation with the first robot module while the snake robot advances according to control by the control center; and
separating a second robot module connected to the rearmost portion when the propagation situation with the first robot module is degraded to a predetermined level.

\* \* \* \* \*